United States Patent
Leschi et al.

(10) Patent No.: US 9,580,182 B2
(45) Date of Patent: Feb. 28, 2017

(54) METHOD OF REGULATING THE SPEED AT WHICH A ROTORCRAFT ROTOR IS DRIVEN UNDER ICING CONDITIONS

(71) Applicant: AIRBUS HELICOPTERS, Marignane (FR)

(72) Inventors: Robert Leschi, Marseilles (FR); Andrea Muenzing, Salon de Provence (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 14/881,415

(22) Filed: Oct. 13, 2015

(65) Prior Publication Data

US 2016/0101870 A1   Apr. 14, 2016

(30) Foreign Application Priority Data

Oct. 14, 2014 (FR) .................................. 14 02311

(51) Int. Cl.
| | |
|---|---|
| *B64C 13/04* | (2006.01) |
| *B64C 27/51* | (2006.01) |
| *G08B 19/02* | (2006.01) |
| *B64D 15/20* | (2006.01) |
| *B64C 13/16* | (2006.01) |
| *B64C 27/04* | (2006.01) |
| *B64D 15/00* | (2006.01) |
| *B64D 31/06* | (2006.01) |

(52) U.S. Cl.
CPC .............. *B64D 15/20* (2013.01); *B64C 13/04* (2013.01); *B64C 13/16* (2013.01); *B64C 27/04* (2013.01); *B64D 15/00* (2013.01); *B64D 31/06* (2013.01)

(58) Field of Classification Search
CPC ......... B64C 13/04; B64C 27/51; G08B 19/02; B60H 1/00007; G05D 1/0858; F03D 7/048
USPC .................. 701/3, 7; 416/1; 340/962; 62/119
See application file for complete search history.

(56) References Cited

U.S. PATENT DOCUMENTS

| | | | |
|---|---|---|---|
| 5,313,202 A * | 5/1994 | Hansman, Jr. ......... | G08B 19/02 244/134 R |
| 2007/0118254 A1* | 5/2007 | Barnes ................. | G05D 1/0858 701/3 |

(Continued)

FOREIGN PATENT DOCUMENTS

| | | |
|---|---|---|
| EP | 1936186 | 6/2008 |
| EP | 2626557 | 8/2013 |

(Continued)

OTHER PUBLICATIONS

French Search Report for French Application No. FR 1402311, Completed by the French Patent Office on Jun. 9, 2015, 8 Pages.

*Primary Examiner* — Yuri Kan
(74) *Attorney, Agent, or Firm* — Brooks Kushman P.C.

(57) ABSTRACT

A method of regulating the NR speed at which the rotor of a rotorcraft is driven in rotation. On detecting that the rotorcraft is flying under icing conditions in a previously identified critical temperature domain (Dct), the NR speed is either decreased in the situation where the ambient outside air temperature (OAT) lies in a low temperature icing range (Ptb) of the critical temperature domain (Dct), or else it is increased in the situation where the ambient outside air temperature (OAT) lies within a high temperature icing range (Pth) of the critical temperature domain (Dct).

12 Claims, 1 Drawing Sheet

(56) References Cited

U.S. PATENT DOCUMENTS

| | | | |
|---|---|---|---|
| 2012/0226485 A1* | 9/2012 | Creagh | F03D 7/048 703/7 |
| 2013/0189098 A1* | 7/2013 | Covington | B64C 27/51 416/1 |
| 2014/0075975 A1* | 3/2014 | Graaf | B60H 1/00007 62/119 |
| 2014/0229037 A1 | 8/2014 | Dequin et al. | |

FOREIGN PATENT DOCUMENTS

| | | |
|---|---|---|
| FR | 3000465 | 7/2014 |
| GB | 2046690 | 11/1980 |
| WO | 2010143051 A2 | 12/2010 |
| WO | 2010143051 A3 | 12/2010 |

* cited by examiner

METHOD OF REGULATING THE SPEED AT WHICH A ROTORCRAFT ROTOR IS DRIVEN UNDER ICING CONDITIONS

CROSS REFERENCE TO RELATED APPLICATION

This application claims priority to French patent application No. FR 14 02311 filed on Oct. 14, 2014, the disclosure of which is incorporated in its entirety by reference herein.

BACKGROUND OF THE INVENTION (1) Field of the Invention

The present invention lies in the field of methods of deicing outside surfaces of aircraft. More specifically, the present invention relates to ways of deicing the blades of a rotorcraft rotor.

(2) Description of Related Art

In the field of aviation, the problem arises of outside surfaces of aircraft becoming iced. An aircraft may potentially fly under icing conditions that lead to the formation of rime or even solid ice on its outside surfaces, which is not desirable. Rime or ice forming on the outside surfaces of an aircraft leads in particular to the aircraft becoming heavier and also affects its aerodynamic characteristics, thereby affecting its performance.

Icing conditions for the outside surfaces of an aircraft are typically identified in application of various criteria including in particular, for an aircraft or given structure, the overall structure of the aircraft and the arrangement of its outside surfaces under consideration, the aircraft's operating point within its flight envelope, and atmospheric conditions.

The atmospheric conditions identifying icing conditions for outside surfaces of an aircraft under consideration conventionally vary depending on various meteorological parameters of values that are identified during flight tests.

Among such meteorological parameters, account is taken in particular of ambient temperature, of the concentration of water in the ambient outside air, and of the mean volume diameter of the water droplets contained in the ambient outside air.

For a rotorcraft in particular, it is observed more particularly that the blades of the rotors of the aircraft lose the greatest amount of performance when the aircraft is flying under icing conditions in a determined ambient temperature range that is referred to below as the "critical temperature domain".

The critical temperature domain is identified in particular by temperature sensors, and it extends between a "low" temperature and a "high" temperature. The concentration of liquid water in the ambient outside air is commonly identified by icing detectors and/or by specific probes, for example.

The mean volume diameter of droplets of water contained in the ambient outside air is identified in particular by laser droplet size probes, such as forward scattering spectrometer probes (FFSP) or cloud droplet probes (CDP).

Other criteria based on the perception of the pilot may also potentially be taken into account for identifying icing conditions on outside surfaces of an aircraft, such as a variation in the flying behavior of the aircraft, and in particular in its vibratory behavior.

As a result of measurements taken during said test flights, the pilot of a production aircraft having the same structure as the aircraft used during said test flights can identify the icing conditions to which the outside surfaces of the production aircraft are subjected and can consequently adapt accordingly the way in which the production aircraft is flown.

The pilot of the production aircraft can in particular identify said icing conditions on the basis of values for meteorological parameters as supplied by the on-board instrumentation of the aircraft and/or by a weather station, and on the basis of the pilot's own experience of the impact of meteorological conditions on the behavior of the production aircraft.

In addition, means for deicing the outside surfaces of an aircraft are commonly operated as a result of icing conditions being identified, either by the human pilot or else by ice detectors identifying the presence of ice on the outside surfaces of the aircraft, or indeed by instruments of the kind described in Document GB 2 046 690 (Secretary of State for Defense). Such instruments serve in particular to identify the presence of ice on the blades of a rotorcraft rotor by comparing the real driving torque delivered to the rotor with a predetermined driving torque corresponding to operation under normal meteorological conditions, i.e. in the absence of icing. By way of example, the predetermined driving torque may be calculated in particular as a function of the collective pitch (angle) of the blades of the rotorcraft rotor.

In this context, and more particularly concerning rotorcraft flying under icing conditions, the formation of rime or ice on the blades of a rotorcraft rotor affects the performance of the rotor.

The formation of rime or ice on the blades of a rotorcraft rotor is particularly harmful for the main rotor of a rotorcraft that serves essentially to provide the rotorcraft with lift, and possibly also with propulsion and/or guidance in flight in the specific example of a helicopter.

When a rotorcraft is flying under icing conditions, any rime or ice picked up on the blades of the rotor(s) of the rotorcraft greatly decreases rotor performance. Such a loss of rotor performance is induced in particular by a rapid increase in the drag of the blades because of the deposition of rime or ice changing their aerodynamic profile.

Furthermore, the rotors of a rotorcraft are conventionally driven in rotation by a power plant of the rotorcraft that includes at least one fuel-burning engine, in particular a turboshaft engine.

A control unit generates a setpoint for the speed at which each rotor, and in particular the main rotor, should be driven, which setpoint is referred to as the NR setpoint. The NR setpoint is transmitted to a regulator unit that regulates the speed of operation of the engine(s) in order to drive the rotor(s), and in particular the main rotor, at a speed referred to as the NR speed, that complies with the NR setpoint.

Proposals have also been made concerning a main rotor of a rotorcraft to cause the value of the NR setpoint to vary over a range of values extending by way of example approximately from 92% to 107% of the nominal speed of rotation at which the main rotor is to be driven. Variation in the value of the NR setpoint is controlled by the control unit in application of various criteria for achieving specific results, such as a reduction in the noise generated by the main rotor during a stage of approaching a landing point, or increasing the performance of the rotorcraft when flying in various specific stages of flight.

In this context, reference may be made for example to the following Documents: FR 3 000 465 (Airbus Helicopter); US 2007/118254 (G. W. Barnes et al.); and WO 2010/143051 (Agusta S P A et al.), which disclose various ways of controlling such variation in the NR speed of a rotorcraft main rotor.

In a field remote from the present invention and relating to wind turbines for producing electricity, methods are known for identifying icing conditions of the blades of a rotor of a turbine as a function of meteorological conditions.

By way of example, reference may be made on this topic to the following Documents: EP 1 936 186 (General Electric company); US 2012/0226485 (A. Creagh et al.); and EP 2 626 557 (Siemens A G).

More particularly with reference to Document EP 2 626 557, proposals have also been made to limit the icing of the blades of a wind turbine rotor by varying the speed of rotation of said rotor. More particularly, information about the rate of heat loss from the blades is collected and the speed of the rotor is controlled depending on that information.

By way of example, the rate of heat loss from the blades is determined on the basis of a simulation or of a physical model of the blades while the rotor is exposed to a given ambient temperature and for a given ambient wind characterized by its speed relative to the ground.

Still with reference to EP 2 626 557, account may also be taken of the speed of rotation of the wind turbine, the rate of heat loss from the blades possibly increasing with a decrease in ambient temperature, depending on the increase in wind speed and/or depending on the increase in the speed of rotation of the turbine. The speed of rotation of the turbine is controlled with reference to the rate of heat loss from the blades, for example by adjusting the electrical power generated by the turbine.

BRIEF SUMMARY OF THE INVENTION

In this context, the present invention provides a method of regulating the drive speed of at least one rotor of a rotorcraft when said rotorcraft is under icing conditions. Said at least one rotor of the rotorcraft is in particular at least one main rotor having a drive axis that is substantially vertical and providing the rotorcraft essentially with lift, and possibly also with propulsion and/or guidance in flight in the specific example of a helicopter. Nevertheless, it should be understood that the method of the present invention is potentially applicable to regulating the rotary drive speed of at least one auxiliary rotor of a rotorcraft and having an axis that is substantially horizontal.

Such an auxiliary rotor conventionally forms an anti-torque device for stabilizing and/or guiding the rotorcraft in yaw, typically being formed by a tail rotor carried at the end of a tail boom of the rotorcraft, or indeed potentially being formed by a propulsive propeller in the example of a high forward speed helicopter.

The present invention seeks more particularly to provide such a method for controlling the effects on the performance of said at least one rotor as a result of possible icing of the blades making up its rotary wing when the rotorcraft is under icing conditions.

In this context, the method of the present invention is a method of regulating the rotary drive speed of at least one said rotor of an aircraft, referred to as the NR speed, particularly but not exclusively a main rotor serving essentially to provide the rotorcraft with lift.

Said NR speed varies over a predefined range of NR speed variation under the control of at least one control unit that generates a setpoint referred to as the NR setpoint. On the basis of said NR setpoint, a regulator unit regulates the operating speed of at least one turboshaft engine supplying at least the mechanical power needed for driving said at least one rotor at an NR speed in compliance with the NR setpoint.

In the present invention, the method comprises the operations described below.

Firstly, it is detected when the rotorcraft is flying under icing conditions. The temperature of the ambient outside air surrounding the rotorcraft is measured by the on-board instrumentation of the rotorcraft, such as for example by a temperature sensor of the rotorcraft.

It is then detected whether the rotorcraft is flying in an outside environment at an ambient temperature lying within a predefined range of values referred to as the critical temperature domain. Said critical temperature domain is identified in particular as extending between a predetermined high temperature and a predetermined low temperature.

As mentioned above, the critical temperature domain is typically previously identified during test flights on board a test rotorcraft of given structure. In the specific example of a rotorcraft rotor, in particular a main rotor, the critical temperature domain conventionally lies within a temperature range extending, by way of example, from a high temperature of −7° C. (minus 7° Celsius) to a low temperature of −18° C. (minus 18° Celsius).

Furthermore, and as mentioned above, the rotorcraft flying under icing conditions may potentially be identified by taking account of at least one criterion for identifying that the rotorcraft flying under icing conditions identifying a severe risk of the blades of said at least one rotor icing.

Such criteria identifying a severe risk of icing of the blades of the rotor comprise for example, in isolation or in combination:

for a given fixed operating point in flight, variation in the drive torque delivered to the rotor by said at least one turboshaft engine, e.g. and by way of indication a variation of about 5%;

a variation in the vibratory behavior of the rotorcraft, in particular as identified by the human pilot of the rotorcraft and possibly also as identified by the on-board instrumentation of the rotorcraft detecting a sudden variation in the vibratory phenomena of the rotorcraft;

the concentration of water in the ambient outside air, in particular as identified by information supplied by at least one icing detector and/or specific probes mounted on board the rotorcraft, for example, and/or also;

the mean volume diameter of water droplets contained in the ambient outside air, which may potentially be identified by a laser droplet size probe, for example.

Secondly, consideration is given to low and high temperature icing ranges extending on either side of a temperature within the critical temperature domain and lying between said high and low temperatures respectively, which temperature is referred to as the middle temperature.

In accordance with the approach of the invention, said critical temperature domain is split into two distinct end temperature ranges respectively constituted by said low temperature icing range and by said high temperature icing range.

On detecting that the rotorcraft is flying in an outside environment at an ambient temperature lying in said critical temperature domain, a relationship is applied by the control unit for calculating an NR setpoint, which relationship is referred to as the relationship for calculating NR under icing conditions, and is applied in the following manners:

decreasing the NR speed in the situation where the ambient outside air temperature lies in the low temperature icing range of the critical temperature domain; and increasing the NR speed in the situation where the ambient outside air temperature lies in the high temperature icing range of the critical temperature domain.

In accordance with the approach of the present invention, it is found that kinetic energy being exchanged between the blades and the flow of air including droplets of water striking the leading edges of the blades leads to heating, at least of the blades.

In this context, when the rotorcraft is flying in the low temperature icing range, the present invention proposes decreasing the NR speed so as to decrease the surface temperature of the blades of the rotor, thereby making it possible to obtain shapes that are more aerodynamic for the ice that is picked up on the blades by virtue of a thermodynamic balance at the surfaces of the blades that is more suitable for forming ice of known type commonly referred to as "rime ice".

In addition, still in accordance with the approach of the present invention, it is also observed that the further the temperature of the ambient outside air drops within the critical temperature domain, the more the concentration of water in the ambient outside air decreases. It is more particularly proposed by the present invention to make use of a potential reduction in ice being picked up on the blades of the rotor as a result of such a decrease in the concentration of water in the ambient outside air.

Furthermore, when the rotorcraft is flying in the high temperature icing range, the NR speed is increased in order to avoid rime and/or ice forming on the blades, by taking the opportunity to heat the blades as a result of supercooled water droplets contained in the ambient outside air striking against their leading edges. Proposals are made more particularly by the present invention to take advantage of such heating of the blades in order to oppose the formation of rime and/or ice on the blades when the aircraft is flying in said high temperature icing range.

On this topic, it should be recalled that in application of the law of conservation of energy, said heating of the blades can be expressed as follows:

$$Ttot-Ts=V^2/2 \times J \times Cp$$

where:

Ttot is the absolute temperature in degrees kelvin;

Ts is the static temperature in degrees kelvin;

V is the speed of the air relative to a given blade of the rotor;

J is the calorie joule conversion factor; and

Cp is the specific heat of air at constant pressure.

In other words, the heating of the blades of the rotor, which is proportional to the speed of the air relative to a given blade raised to the power 2, increases with increasing speed at which the rotor is driven.

Finally, such provisions make it possible to limit the increasing drag effects that might be produced on the blades by the formation of rime and/or ice when the rotorcraft is flying under icing conditions at an ambient outside air temperature lying in the critical temperature domain. When the aircraft is flying at an ambient outside air temperature lying in said low temperature icing range, the ice that is picked up by the blades is produced in shapes that are more aerodynamic. Furthermore, the formation of rime and/or ice on the blades of the rotor is limited when the aircraft is flying under icing conditions while the ambient outside air temperature lies in said high temperature icing range.

For temperatures lower than the temperatures defining the critical temperature domain, the blades are completely iced. Nevertheless, the icing of the blades under such conditions takes place with the ice that is picked up by the blades of the rotor being shaped in a manner that is less penalizing on the performance of the rotor.

Finally, it can be seen from the provisions and selections proposed by the present invention that as a result of increasing or decreasing variation in the NR speed depending on the temperature icing range under consideration, the overall effects on the loss of performance of the rotor when the aircraft is flying under icing conditions are attenuated.

More particularly, the method of the present invention comprises the following operations:

detecting, in particular by means of on-board instrumentation and/or by the human pilot of the rotorcraft, that the rotorcraft is flying under icing conditions. On detecting that the rotorcraft is flying under icing conditions, then the instrumentation on board the rotorcraft performs at least one operation of measuring the ambient outside air temperature surrounding the rotorcraft;

identifying that the rotorcraft is flying at an ambient outside air temperature lying either in one or the other of the low and high temperature icing ranges of the critical temperature domain. Such an identification operation is performed in particular by comparing the ambient outside air temperature with temperatures marking the boundaries of each of the low and high temperature icing ranges, respectively. As a reminder, the high temperature icing range extends from the high temperature to the middle temperature, and the low temperature icing range extends from the middle temperature to the low temperature;

identifying the current NR setpoint value generated by the control unit and then:

in the situation where the ambient outside air temperature lies outside the critical temperature domain, the control unit continuing to generate the current NR setpoint;

in the situation where the ambient outside air temperature lies within the high temperature range, the control unit increasing the value of the current NR setpoint within the range of NR speed variation; and in the situation where the ambient outside air temperature lies in the low temperature icing range, the control unit decreasing the value of the current NR setpoint within the range of NR speed variation.

In one implementation, the alternative operations of increasing or conversely decreasing the NR speed under icing conditions are performed by applying to respective NR setpoints values that are equal to the values marking the boundaries of said range of NR speed variation.

It should naturally be understood that in order to decrease the NR speed, the value of the NR setpoint that is generated corresponds to the low value of said range of NR speed variation, and by way of indication for a main rotor, is about 92% of the nominal speed at which rotation should be driven.

Likewise, in order to increase the NR speed, the value of the NR setpoint corresponds to the high value of said range of NR speed variation, and by way of indication, for a main rotor, is about 107% of said nominal speed at which rotation should be driven.

In another implementation, the alternative operations of increasing or conversely decreasing the NR speed under icing conditions are performed by applying respective NR setpoints having values that vary depending on the variation of the ambient outside air temperature within the high or low temperature icing range under consideration.

By way of example, in order to avoid sustained variation in the value of the NR setpoint, the value of the NR setpoints are varied depending on variation in the ambient outside air temperature by taking account of predefined sub-ranges of temperature variation, and by way of example the sub-ranges may be from 1° C. to 3° C. wide.

Furthermore, it is preferable to restrict execution of said operation of NR variation under icing conditions in the event where a variation in the NR speed is applied on the basis of other criteria, such as for example the criteria that are taken into account in above-mentioned Document FR 3 000 465.

More particularly, in a preferred implementation, said relationship for calculating NR under icing conditions is applied under the condition of giving priority to executing at least any one other relationship for calculating a variation in the NR speed.

It should naturally be understood in this context that priority for executing said at least any one other calculation relationship is taken into account in particular for reasons of ensuring that the rotorcraft flies safely.

Said condition on varying NR under icing conditions is applied in application of a predefined execution priority table for the various predefined relationships for calculating variation in the NR speed.

It should be observed that relationship for calculating NR under icing conditions may advantageously be incorporated in a calculation rule that also incorporates at least any one other relationship for calculation to vary the NR speed.

Such provisions are particularly advantageous when such a calculation rule, e.g. as disclosed in Document FR 3 000 465, could lead potentially to continuous variation in the NR speed on the basis in variation in the value of at least one physicochemical parameter of air, such as its density.

The NR setpoint that is then deduced may be corrected by calculation relationships that are specific to varying the value of various parameters taken into account for varying the NR speed.

The rotorcraft flying under icing conditions may potentially be detected by a human pilot of the rotorcraft, in particular by the pilot of the rotorcraft sensing a change in the flying behavior of the rotorcraft, including in particular vibratory phenomena or for example by the human pilot observing ice forming on the walls and/or accessories on the outside of the rotorcraft, such as wipers for cleaning the transparent walls of the rotorcraft or on any external element that projects from the rotorcraft and/or on any wall of the rotorcraft lying in the field of view of the human pilot.

Thereafter, on making such a detection, the human pilot then generates an order to execute the relationship for calculating NR under icing conditions, e.g. by activating a specific control button that may advantageously be incorporated in a member for generating manual flight controls as a result of being moved by a person.

On its own or in combination with the above provisions, it is possible to detect that the rotorcraft is flying under icing conditions by means of an icing detector that then generates icing data causing the relationship for calculating NR under icing conditions to be executed.

Said middle temperature of the critical temperature domain may potentially be a value that subdivides the low and high temperature icing ranges equally.

Nevertheless, it is preferable to determine the value of said middle temperature by calculation depending on the structure of the rotorcraft. More particularly, and by way of example, said middle temperature separating the low and high temperature icing ranges from each other within the critical temperature domain may be determined by the following calculation function:

$$OAT_{(critical)} = -((y-1)/2yA) \times ((2\pi \times NR \times R)/60)^2$$

in which calculation function:
  $OAT_{(critical)}$ is said middle temperature;
  $y$ is a constant having a value of 1.4 and relates to the ratio of specific heats of air, such that $JCp=yA/(y-1)$ at subsonic speeds;
  A has a value of 287 J/kg° K is the perfect gas constant for air;
  NR is the current NR speed of rotation of the rotor expressed in revolutions per minute; and
  R is the radius of the rotor, where the expression $((2\pi \times NR \times R)/60)$ gives the speed of the tip of said rotating blade under consideration in meters per second.

The control unit acts iteratively at a given frequency to calculate the value of the NR setpoint as a function of values for the ambient outside air temperature as supplied continuously or sequentially by the on-board instrumentation of the rotorcraft.

BRIEF DESCRIPTION OF THE SEVERAL VIEWS OF THE DRAWINGS

Embodiments of the present invention are described with reference to the figures of the accompanying sheet, in which.

DETAILED DESCRIPTION OF THE INVENTION

Figure 1:
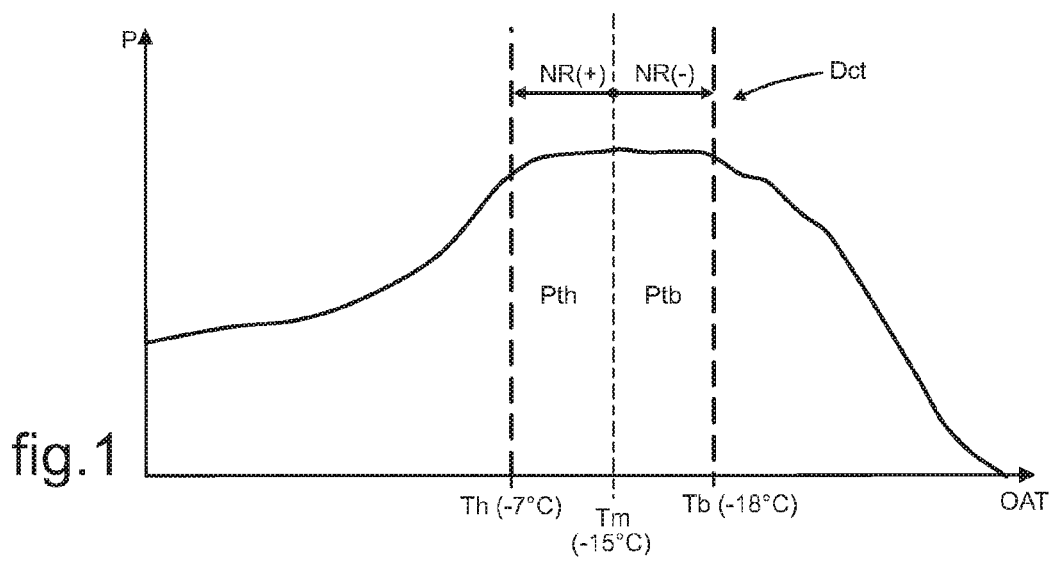
FIG. 1 is a diagram showing variations in the NR speed of a rotorcraft rotor using a general approach of the method of the present invention.

FIG. 1 is a graph plotting a curve illustrating variation in the power P needed for driving a rotorcraft rotor as a function of variation in the ambient outside air temperature OAT surrounding the rotorcraft.

When the rotorcraft is flying under icing conditions, a critical temperature domain Dct is typically identified in which the rotor blades are subjected to a risk of icing. The critical temperature domain Dct is a temperature range extending between a high temperature Th and a low temperature Tb. The critical temperature domain Dct, which varies depending on the structure of the rotorcraft, may be identified in conventional manner during test flights, or by calculation, and/or on the basis of the experience of the pilot performing said test flight.

In the example shown, consideration is given to a critical temperature domain Dct defined between a high temperature Th of about minus 7° C. and a low temperature Tb of about minus 18° C. Typically, the critical temperature domain Dct corresponds to a range of temperatures in the ambient outside air surrounding the rotorcraft in which the losses of rotor performance are the greatest.

In the approach of the present invention, the critical temperature domain Dct is subdivided into two icing temperature ranges, referred to respectively as the high temperature icing range Pth and the low temperature icing range Ptb, which ranges lie on either side of a temperature within the critical temperature domain that is referred to as the middle temperature Tm.

In the example shown, said middle temperature Tm is about minus 15° C., being defined by calculation depending on the nominal speed at which the rotor is driven and/or depending on the arrangement of the rotor, and in particular depending on the structure of the blades making up its rotary wing.

In this context, it is proposed to cause the speed at which the rotor is driven, referred to as the NR speed, to vary while the rotorcraft is flying in the critical temperature domain Dct. The ways in which the NR speed is varied are different depending on the flying conditions of the rotorcraft in the critical temperature domain Dct.

More particularly, in the present invention, the NR speed is increased when the rotorcraft is flying in the high temperature icing range Pth and the NR speed is decreased when the rotorcraft is flying in the low temperature icing range Ptb. Specifically, when the rotorcraft is flying in the critical temperature domain Dct, blade icing conditions vary depending on the particular icing temperature range under consideration.

In the high temperature icing range Pth, the water contained in the ambient outside air is supercooled. When the rotorcraft is flying in the high temperature icing range Pth, it is proposed to increase the NR speed in order to avoid icing of the blades by taking advantage of the blades being heated as a result of the impact of supercooled drops of water contained in the ambient outside air striking their leading edges.

In the low temperature icing range Ptb, it is proposed to reduce the NR speed in order to reduce the surface temperature of the rotor blades.

These provisions enable ice to be formed on the blades, and in particular on their leading edges, which ice is of aerodynamic shape, thereby limiting the loss of rotor performance.

Figure 2:
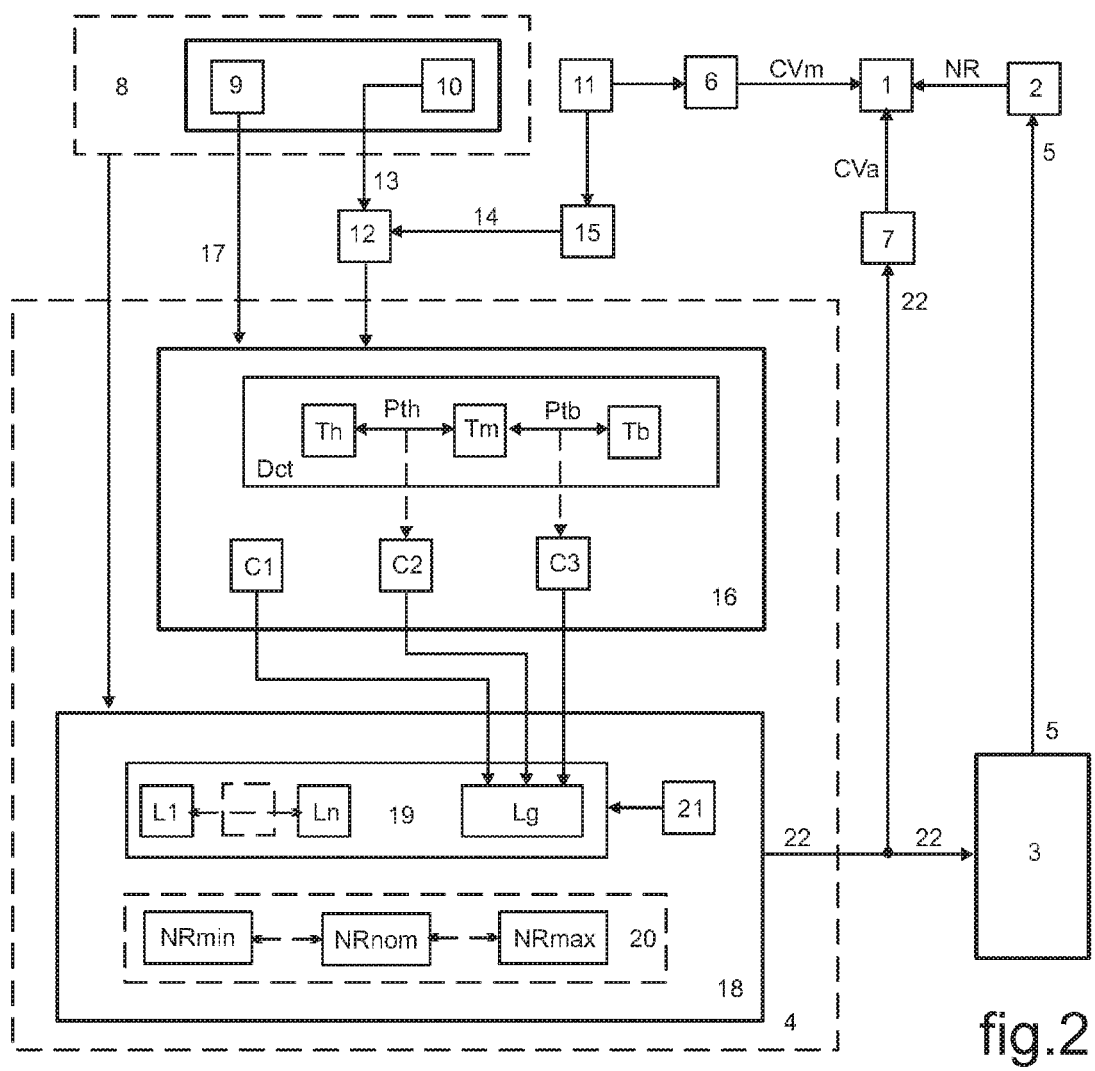
FIG. 2 is a block diagram showing specific implementations of the method of the present invention.

FIG. 2 shows the ways in which the NR speed of a rotor 1 of a rotorcraft flying in the critical temperature domain Dct can be varied in compliance with the provisions shown in FIG. 1.

The rotor 1 is driven in rotation by a power plant 2 including at least one fuel-burning engine, in particular a turboshaft engine. The operating speed of the engines is put under the control of a regulator unit 3.

Depending on setpoints 22, referred to as NR setpoints, which are generated by a control unit 4, the regulator unit 3 generates control signals 5 for regulating the operating speed of the engine(s) of the power plant 2, typically such as signals for controlling the supply of fuel to the engine(s).

Conventionally, the pitch of the blades of the rotor, and in particular of the main rotor, is varied collectively and/or cyclically under the effect of flight control signals CVm or CVa as generated by a pilot of the rotorcraft. More particularly, a human pilot 11 conventionally has manual control members 6 that generate manual flight control signals CVm on being moved by a person.

Furthermore, the rotorcraft may potentially be fitted with an autopilot 7 that generates automatic flight control signals CVa when it is in operation in at least one mode of operation for stabilizing and/or guiding the flight of the rotorcraft.

Furthermore, the rotorcraft has on-board instrumentation 8 including in particular sensors and/or probes for identifying the flight conditions of the rotorcraft, in particular with respect to its outside environment. The on-board instrumentation 8 includes in particular at least one temperature sensor 9 measuring the temperature of the ambient outside air surrounding the rotorcraft and/or one or more ice detectors 10.

In conventional manner, the on-board instrumentation 8 supplies data relating to the rotorcraft flying under icing conditions 12, e.g. on the basis of icing data 13 supplied by said at least one ice detector 10.

The fact that the rotorcraft is flying under icing conditions 12 can also be identified by the human pilot 11 of the rotorcraft, e.g. by visually observing ice forming on the outside surfaces of the rotorcraft, or indeed, by way of example, by sensing a significant change in the behavior of the rotorcraft, such as in particular variation in its vibratory behavior. The human pilot 11 of the rotorcraft can then generate an order 14 to execute a change in the NR speed by activating a specific control button 15 dedicated to this purpose.

Temperature data 17 relating to the ambient outside air temperature OAT is transmitted by the temperature sensor 9 to a first computer 16 that is preferably incorporated in the control unit 4. In the event of the rotorcraft flying under icing conditions 12, the first computer 16 uses the temperature data 17 to identify the flying conditions of the rotorcraft relative to the critical temperature domain Dct.

More particularly, depending on the temperature data 17, the first computer 16 identifies that the rotorcraft is flying in the high temperature icing range Pth or in the low temperature icing range Ptb.

Depending on the flying conditions of the rotorcraft in one or the other of the high or low temperature icing ranges Pth or Ptb, respectively, the first computer 16 identifies various flying situations of the rotorcraft for which the control unit generates respective specific NR setpoints 22.

The first computer 16 identifies the various flying situations of the rotorcraft by comparing the temperature data 17 with each of the temperatures marking the boundaries of the icing temperature ranges Pth and Ptb, specifically firstly the high temperature Th and the middle temperature Tm for the high temperature icing range Pth, and secondly the middle temperature Tm and the low temperature Tb for the low temperature icing range Ptb.

In this context, the first computer 16 identifies in particular:

a first situation C1 in which the rotorcraft is flying in an outside environment at a temperature OAT that lies outside the critical temperature domain Dct;

a second situation C2 in which the rotorcraft is flying in an outside environment with a temperature OAT lying in the high temperature icing range Pth; and a third situation C2 in which the rotorcraft is flying in an outside environment with a temperature OAT lying in the low temperature icing range Ptb.

The second computer 18 executes a calculation rule 19 incorporating at least one relationship for calculating the NR setpoint, referred to as the relationship Lg for calculating NR under icing conditions, which rule serves to determine the value of the NR setpoint depending on the flying situation of the rotorcraft as previously identified by the first computer 16.

Naturally, the first computer 16 and the second computer may potentially be incorporated in a single calculation unit that is preferably incorporated in the control unit 4. Nevertheless, in analogous manner, the first computer 16, the second computer 18, and indeed said calculation unit, could be incorporated in any of the calculation means on board the rotorcraft.

It should be observed that in conventional manner in the context of controlled variation of the NR speed, the NR speed is caused to vary in a predefined range 20 for variation of the NR speed between a minimum NR speed NRmin and a maximum NR speed NRmax that are typically identified relative to a nominal speed of rotation NRnom. By way of indication concerning a main rotor, the minimum NR speed NRmin is about 92% of the nominal speed of rotation NRnom, and the maximum NR speed NRmax is about 107% of the nominal speed of rotation NRnom. It should naturally be understood that the values given for the minimum NR speed NRmin and the maximum NR speed NRmax are given by way of indication and may vary depending on the capabilities of the rotorcraft, or indeed on technological change.

The NR setpoint is calculated more particularly by applying the relationship Lg for calculating NR under icing conditions in the following manners:

in the C1 situation where the ambient outside air temperature OAT lies outside the critical temperature domain Dct, the control unit 4 continues to generate the current NR setpoint;

in the C2 situation in which the ambient outside air temperature OAT lies in the high temperature range Pth, the current NR setpoint 22 is increased; and in the C2 situation where the ambient outside air temperature OAT lies in the low temperature icing range Ptb, the value of the current NR setpoint 22 is reduced.

In application of the relationship for calculating NR under icing conditions 12, the value of the NR setpoint potentially varies in a variety of alternative ways, such as for example in the following ways:

either by applying predefined values, such as for example the maximum NR speed NRmax in the second rotorcraft flight situation C2 and the minimum NR speed NRmin in the third rotorcraft flight situation C3;

or else by varying the value of the NR setpoint 22 as a function of variation in the ambient outside air temperature OAT within the icing temperature range Pth or Ptb under consideration, preferably as considered in sub-ranges of temperature variation, e.g. sub-ranges of 2° C.

Furthermore, consideration should be given to the fact that the calculation rule 19 potentially incorporates a plurality of relationships L1, . . . , Ln for calculating the NR setpoint 22 using various criteria, such as the following non-limiting criteria:

a criterion relating to the forward speed or to the rate of altitude change of the rotorcraft;

a criterion relating to the stage of flight of the rotorcraft, such as a takeoff stage, a landing stage, or a stage in which the rotorcraft is in cruising flight;

a criterion of reducing sound nuisance generated by the rotorcraft; and/or a criterion relating to the altitude of the rotorcraft and/or to the height at which it is flying above the ground.

In this context, is desirable for the generation of the NR setpoint 22 by applying at least one of the relationships L1, . . . , Ln for calculating the NR setpoint 22 to be determined on the basis of a priority classification so as to avoid potential conflicts between the various relationships L1, . . . , Ln for calculating the NR setpoint 22.

For this purpose, the second computer 18 supplies a predefined table 21 giving priority for executing the various calculation relationships L1, . . . , Ln that are incorporated in the calculation rule 19. The table 21 identifies priorities for execution and/or for taking into consideration the various relationships L1, . . . , Ln for calculating the NR setpoint as a function of various predefined selection criteria.

By way of indication, such selection criteria relate in particular to taking account of the rotorcraft flying under conditions that are safe, e.g. with respect to its current stage of flight, weather conditions, the rotorcraft's own mechanical power resources, the mission of its flight, and/or the possibility of the rotorcraft flying in a hostile environment.

What is claimed is:

1. A method of regulating a speed at which at least one rotor of a rotorcraft is driven in rotation, referred to as a NR speed, which NR speed varies over a predefined range of NR speed variation under a control of at least one control unit generating a setpoint, referred to as a NR setpoint, which NR setpoint is used by a regulator to regulate a speed of operation of at least one turboshaft engine supplying at least a mechanical power needed for driving at least one rotor at a NR speed in compliance with the NR setpoint, the method comprising:

detecting that the rotorcraft is flying under icing conditions;

using an on-board instrumentation of the rotorcraft to detect an ambient outside air temperature (OAT) surrounding the rotorcraft and to detect that the rotorcraft is flying in an outside environment at an ambient outside air temperature (OAT) lying in a predefined range of values, referred to as a critical temperature domain (Dct), as identified between a predetermined high temperature (Th) and a predetermined low temperature (Tb); and then after detecting that the rotorcraft is flying in an outside environment at an ambient outside air temperature (OAT) lying within the critical temperature domain (Dct), and taking into consideration a low temperature icing range (Ptb) and a high temperature icing range (Pth) respectively that extend on either side of a temperature lying within the critical temperature domain (Dct) between the high temperature (Th) and the low temperature (Tb), and referred to as a middle temperature (Tm), the control unit applying a relationship for calculating an NR setpoint, referred to as a relationship (Lg) for calculating NR under icing conditions, as follows:

decreasing the NR speed in a situation where the ambient outside air temperature (OAT) lies in the low temperature icing range (Ptb) of the critical temperature domain (Dct); and increasing the NR speed in a situation where the ambient outside air temperature (OAT) lies in the high temperature icing range (Pth) of the critical temperature domain (Dct).

2. The method according to claim 1 further comprising:

detecting that the rotorcraft is flying in icing conditions, including at least one operation of the on-board instrumentation of the rotorcraft measuring the ambient outside air temperature (OAT) surrounding the rotorcraft;

identifying that the rotorcraft is flying at an ambient outside air temperature (OAT) lying either in one or the other of the low temperature icing range (Ptb) and the high temperature icing range (Pth) respectively of the critical temperature domain (Dct), by comparing the ambient outside air temperature (OAT) with the high, low, and middle temperatures (Th, Tm, Tb) marking boundaries of the high temperature icing range (Pth) and the low temperature icing range (Ptb); and identifying a value of a current NR setpoint generated by the control unit and then:

in a situation where the ambient outside air temperature (OAT) lies outside the critical temperature domain (Dct), the control unit continuing to generate the current NR setpoint;

in the situation where the ambient outside air temperature (OAT) lies in the high temperature icing range (Pth), the control unit increasing the value of the current NR setpoint within the predefined range of NR speed variation; and in the situation where the ambient outside air temperature (OAT) lies in the low temperature icing range (Ptb), the control unit decreasing the value of the current NR setpoint within the predefined range of NR speed variation.

3. The method according to claim 1, wherein alternative operations of increasing or conversely decreasing the NR speed under icing conditions are performed by applying values to respective NR setpoints that are equal to values marking boundaries of the predefined range of NR speed variation.

4. The method according to claim 1, wherein alternative operations of increasing or conversely decreasing the NR speed under icing conditions are performed by applying respective NR setpoints having values that vary depending on a variation of the ambient outside air temperature (OAT) within the high temperature icing range (Pth) or the low temperature icing range (Ptb) under consideration.

5. The method according to claim 4, wherein the values of the NR setpoints are varied depending on variation in the ambient outside air temperature (OAT) by taking account of predefined sub-ranges of temperature variation.

6. The method according to claim 1, wherein the relationship (Lg) for calculating NR under icing conditions is applied while giving priority to an execution of at least any one other calculation relationship (L1, . . . , Ln) for causing a variation in the NR speed by applying a predefined execution priority table for the at least any one other calculation relationships (L1, . . . , Ln) for calculating variation in the NR speed.

7. The method according to claim 1, wherein the relationship (Lg) for calculating NR under icing conditions is incorporated in a calculation rule that also incorporates at least any one other relationship (L1, . . . , Ln) for calculation to vary the NR speed.

8. The method according to claim 1, wherein the rotorcraft flying under icing conditions is detected by a human pilot of the rotorcraft, who then generates an order to execute the relationship (Lg) for calculating NR under icing conditions.

9. The method according to claim 1, wherein the rotorcraft flying under icing conditions is detected by at least one icing detector, which then generates icing data leading to the relationship (Lg) for calculating NR under icing conditions being executed.

10. The method according to claim 1, wherein the middle temperature (Tm) is determined by the following calculation function:

$$OAT_{(critical)} = -((y-1)/2yA) \times ((2\pi \times NR \times R)/60)^2$$

in which calculation function:
$OAT_{(critical)}$ is the middle temperature (Tm);
$y$ is a constant having a value of 1.4;
A has a value of 287 J/kg° K;
NR is the current NR speed of the rotor; and
R is a radius of the rotor, the expression $((2\pi \times NR \times R)/60)$ identifying a speed at a tip of a blade under consideration.

11. A method of regulating a speed at which at least one rotor of a rotorcraft is driven in rotation, referred to as a NR speed, which NR speed varies over a predefined range of NR speed variation under a control of a controller generating a setpoint, referred to as a NR setpoint, which NR setpoint is used to regulate a speed of operation of at least one turboshaft engine supplying at least a mechanical power needed for driving at least one rotor at a NR speed in compliance with the NR setpoint, the method comprising:

detecting that the rotorcraft is flying under icing conditions;

using an on-board instrumentation of the rotorcraft to detect an ambient outside air temperature (OAT) surrounding the rotorcraft and to detect that the rotorcraft is flying in an outside environment at an ambient outside air temperature (OAT) lying in a predefined range of values, referred to as a critical temperature domain (Dct), as identified between a predetermined high temperature (Th) and a predetermined low temperature (Tb); and then after detecting that the rotorcraft is flying in an outside environment at an ambient outside air temperature (OAT) lying within the critical temperature domain (Dct), and taking into consideration a low temperature icing range (Ptb) and a high temperature icing range (Pth) respectively that extend on either side of a temperature lying within the critical temperature domain (Dct) between the high temperature (Th) and the low temperature (Tb), and referred to as a middle temperature (Tm), the controller applying a relationship for calculating an NR setpoint, referred to as a relationship (Lg) for calculating NR under icing conditions, as follows:

decreasing the NR speed in a situation where the ambient outside air temperature (OAT) lies in the low temperature icing range (Ptb) of the critical temperature domain (Dct); and increasing the NR speed in a situation where the ambient outside air temperature (OAT) lies in the high temperature icing range (Pth) of the critical temperature domain (Dct).

12. The method according to claim 11 further comprising:

detecting that the rotorcraft is flying in icing conditions, including at least one operation of the on-board instrumentation of the rotorcraft measuring the ambient outside air temperature (OAT) surrounding the rotorcraft;

identifying that the rotorcraft is flying at an ambient outside air temperature (OAT) lying either in one or the other of the low temperature icing range (Ptb) and the high temperature icing range (Pth) respectively of the critical temperature domain (Dct), by comparing the ambient outside air temperature (OAT) with the high, low, and middle temperatures (Th, Tm, Tb) marking boundaries of the high temperature icing range (Pth) and the low temperature icing range (Ptb); and identifying a value of a current NR setpoint generated by the controller and then:

in a situation where the ambient outside air temperature (OAT) lies outside the critical temperature domain (Dct), the controller continuing to generate the current NR setpoint;

in the situation where the ambient outside air temperature (OAT) lies in the high temperature icing range (Pth), the controller increasing the value of the current NR setpoint within the predefined range of NR speed variation; and in the situation where the ambient outside air temperature (OAT) lies in the low temperature icing range (Ptb), the controller decreasing the value of the current NR setpoint within the predefined range of NR speed variation.

* * * * *